United States Patent
Prociw et al.

(10) Patent No.: US 8,745,989 B2
(45) Date of Patent: Jun. 10, 2014

(54) REVERSE FLOW CERAMIC MATRIX COMPOSITE COMBUSTOR

(75) Inventors: Lev Alexander Prociw, Elmira (CA); Aleksander Kojovic, Oakville (CA); David C. Jarmon, Kensington, CT (US); Jun Shi, Glastonbury, CT (US); Shaoluo L. Butler, Manchester, CT (US)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 878 days.

(21) Appl. No.: 12/420,973

(22) Filed: Apr. 9, 2009

(65) Prior Publication Data

US 2010/0257864 A1 Oct. 14, 2010

(51) Int. Cl.
*F02C 1/00* (2006.01)
*F23R 3/00* (2006.01)
*F23R 3/54* (2006.01)
*F02C 3/14* (2006.01)

(52) U.S. Cl.
CPC . *F23R 3/007* (2013.01); *F23R 3/54* (2013.01); *F02C 3/145* (2013.01); *F05D 2300/6033* (2013.01)
USPC ............ 60/753; 60/760; 60/800; 60/804

(58) Field of Classification Search
USPC ........... 60/753, 799, 800, 760, 804; 431/343, 431/352, 353
See application file for complete search history.

(56) References Cited

U.S. PATENT DOCUMENTS

| | | | | |
|---|---|---|---|---|
| 3,385,054 A | * | 5/1968 | Land | 60/753 |
| 3,844,116 A | * | 10/1974 | Matto | 60/800 |
| 3,859,786 A | * | 1/1975 | Azelborn et al. | 60/737 |
| 3,880,575 A | | 4/1975 | Cross et al. | |
| 3,911,672 A | * | 10/1975 | Irwin | 60/796 |
| 3,924,403 A | * | 12/1975 | Irwin | 60/796 |
| 3,934,408 A | | 1/1976 | Irwin | |
| 3,943,703 A | * | 3/1976 | Kronogard | 60/791 |
| 3,952,504 A | * | 4/1976 | Sedgwick | 60/753 |
| 3,981,142 A | | 9/1976 | Irwin | |
| 3,982,392 A | * | 9/1976 | Crow | 60/39.23 |
| 4,030,875 A | * | 6/1977 | Grondahl et al. | 60/753 |
| 4,380,896 A | | 4/1983 | Wiebe | |
| 4,787,208 A | * | 11/1988 | DeCorso | 60/723 |
| 4,907,411 A | | 3/1990 | Krüger | |
| 4,909,708 A | * | 3/1990 | Albrecht | 415/208.1 |
| 5,027,604 A | * | 7/1991 | Krueger | 60/752 |
| 5,237,813 A | * | 8/1993 | Harris et al. | 60/804 |
| 5,687,572 A | * | 11/1997 | Schrantz et al. | 60/753 |
| 6,182,451 B1 | | 2/2001 | Hadder | |
| 6,397,603 B1 | * | 6/2002 | Edmondson et al. | 60/753 |

(Continued)

FOREIGN PATENT DOCUMENTS

GB 1570875 * 7/1980 ............ F23R 3/50

*Primary Examiner* — William H Rodriguez
*Assistant Examiner* — Lorne Meade
(74) *Attorney, Agent, or Firm* — Norton Rose Fulbright Canada LLP

(57) ABSTRACT

A gas turbine engine has an annular reverse-flow combustor with a combustor inner liner enclosing a combustion chamber. The inner liner having a dome portion at an upstream end of the combustor and a downstream combustor exit defined between a small exit duct portion and a large exit duct portion. At least one of the dome portion, the small exit duct portion and the large exit duct portion is made of a separately formed hemi-toroidal shell composed of a ceramic matrix composite.

9 Claims, 4 Drawing Sheets

(56) References Cited

U.S. PATENT DOCUMENTS

| | | |
|---|---|---|
| 6,495,207 B1 | 12/2002 | Prociw et al. |
| 6,536,201 B2 * | 3/2003 | Stuttaford et al. ............. 60/782 |
| 6,571,560 B2 * | 6/2003 | Tatsumi et al. ................ 60/753 |
| 6,679,062 B2 | 1/2004 | Conete et al. |
| 6,925,810 B2 * | 8/2005 | Swaffar ......................... 60/752 |
| 7,234,306 B2 | 6/2007 | Aumont et al. |
| 7,237,387 B2 * | 7/2007 | Aumont et al. ................ 60/796 |
| 7,237,388 B2 * | 7/2007 | Aumont et al. ................ 60/796 |
| 7,249,462 B2 | 7/2007 | Aumont et al. |
| 7,350,358 B2 | 4/2008 | Patel et al. |
| 2004/0011058 A1 * | 1/2004 | Baudoin et al. ................ 60/804 |
| 2005/0050902 A1 * | 3/2005 | Anichini et al. ............... 60/800 |
| 2007/0144178 A1 * | 6/2007 | Burd et al. ..................... 60/753 |
| 2012/0328366 A1 * | 12/2012 | Jarmon et al. ................ 403/376 |
| 2012/0328996 A1 * | 12/2012 | Shi et al. ....................... 431/253 |

* cited by examiner

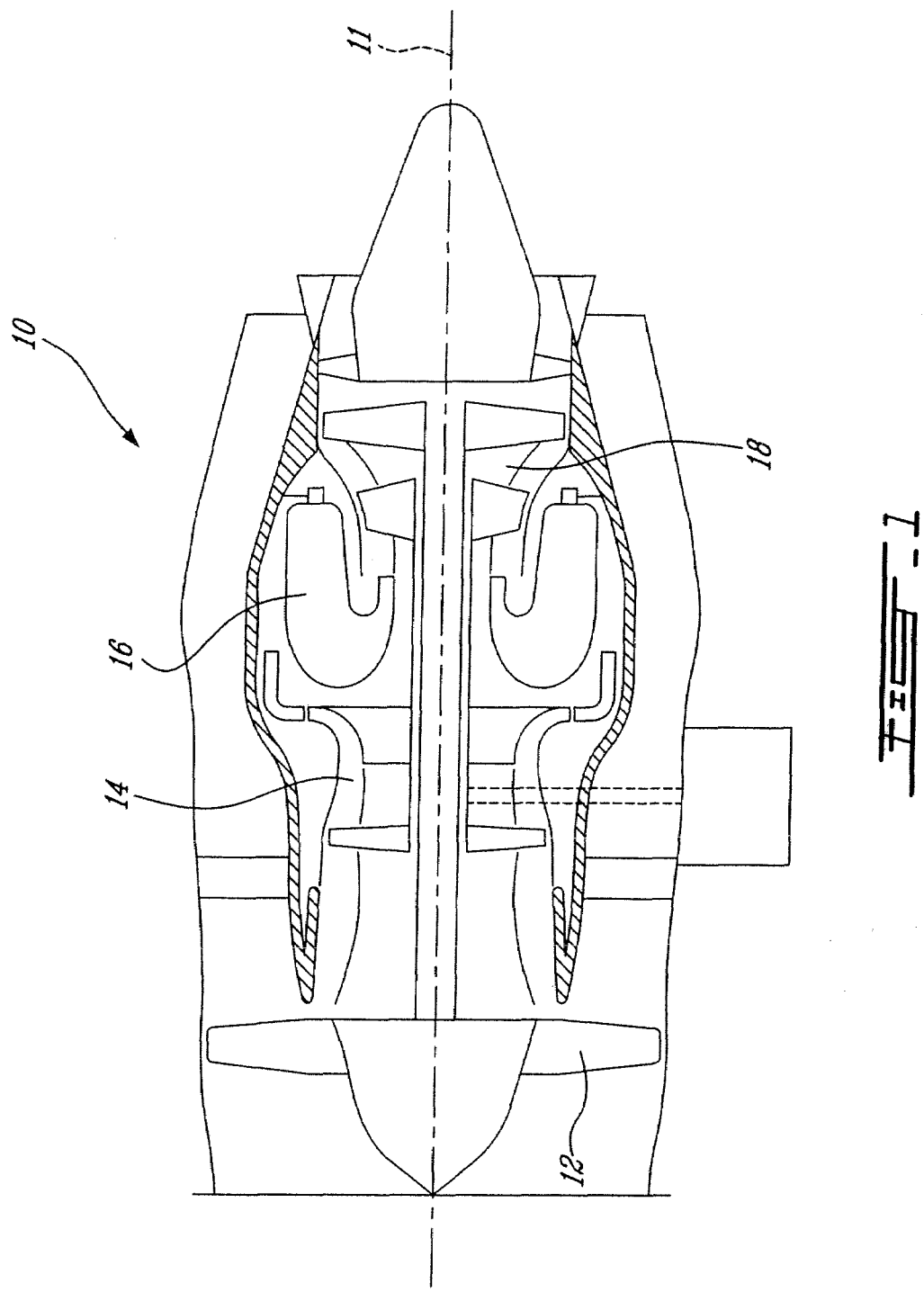

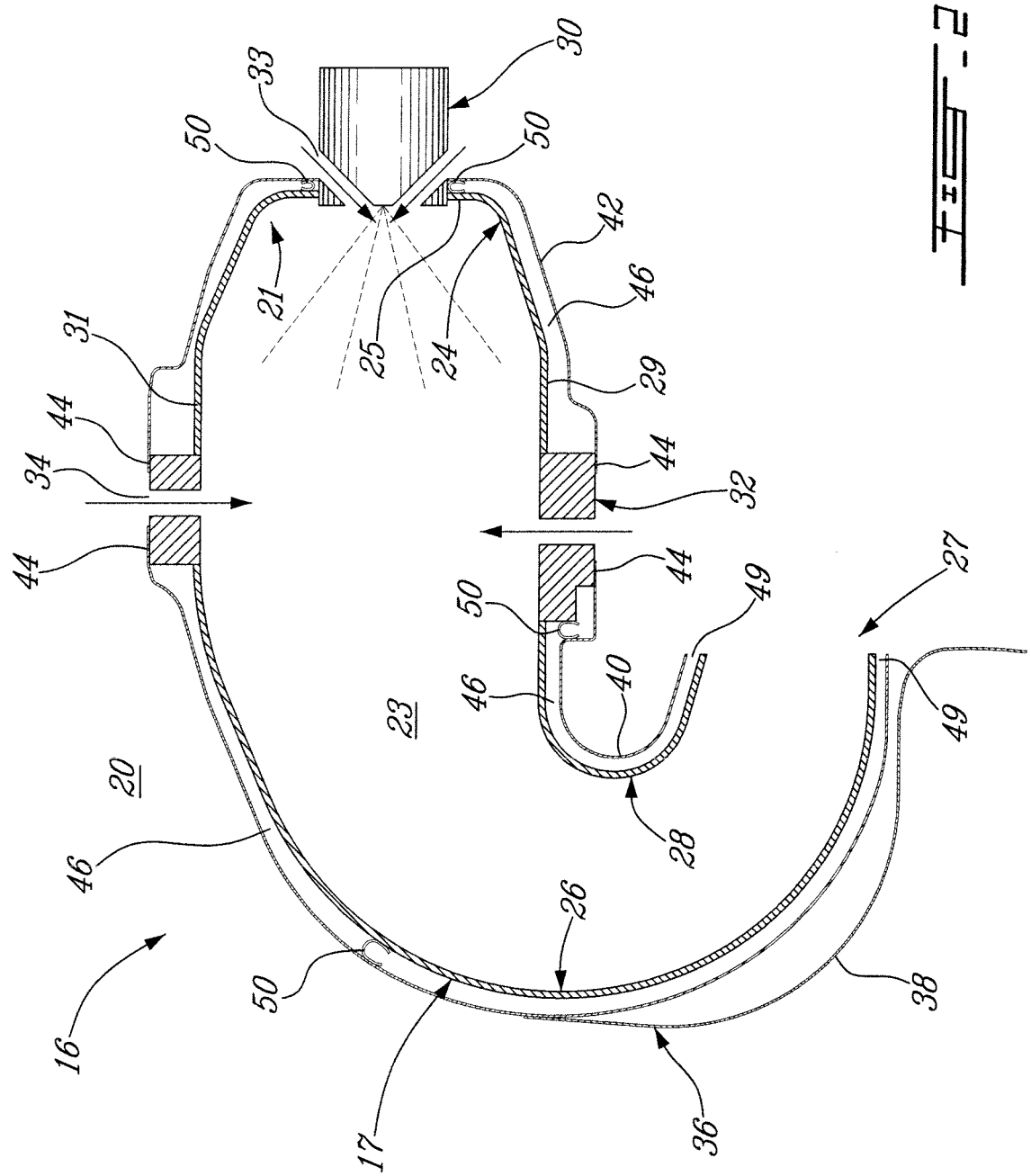

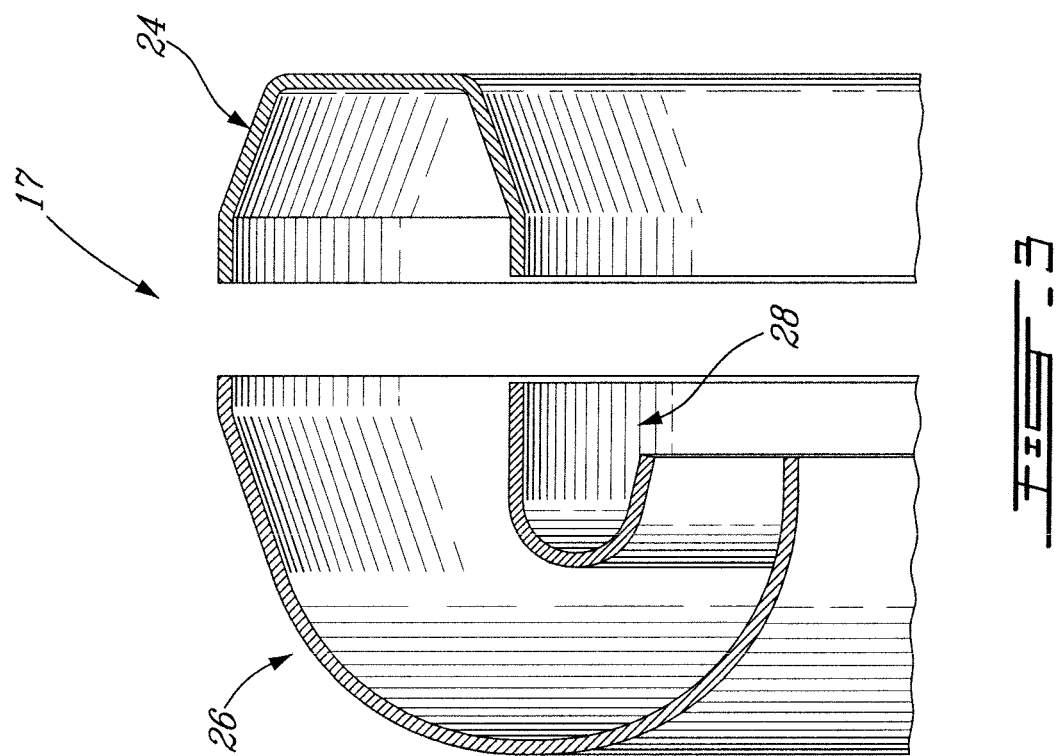

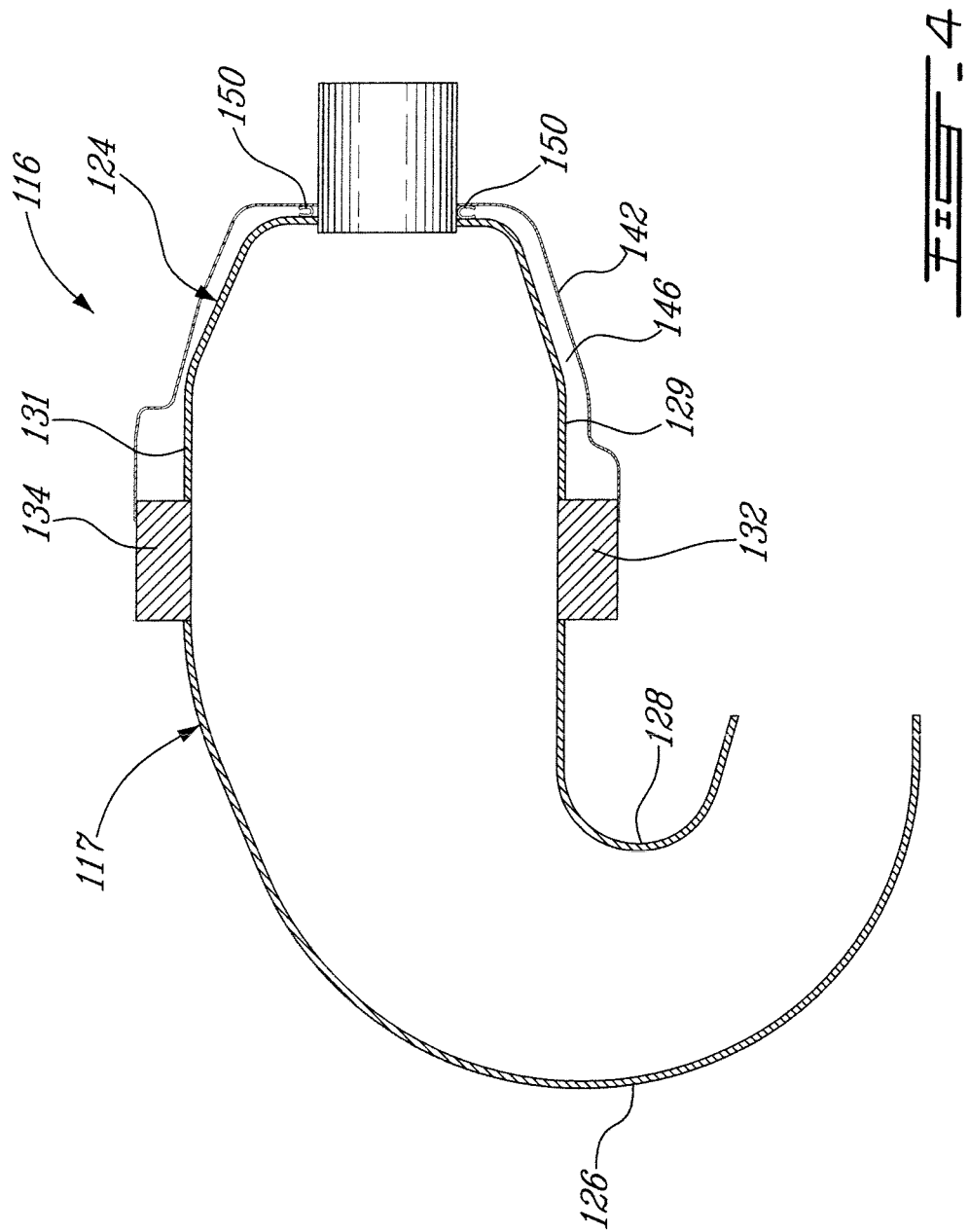

REVERSE FLOW CERAMIC MATRIX COMPOSITE COMBUSTOR

TECHNICAL FIELD

The invention relates generally to gas turbine engines, and more particularly, to a reverse flow combustor for a gas turbine engine.

BACKGROUND

Reverse flow combustors for gas turbine engines are typically constructed out of metal, such as having metallic liner walls for example. Cost and weight requirements have resulted in thin sheet metal being used for combustor liners, however such thin sheet metal combustor liners require significant cooling in order to be able to withstand the high temperature environment to which they are exposed. However, as operating conditions advance, traditional metallic materials are no longer capable of adequately surviving the even higher temperature combustor environments expected.

Ceramic based materials have long been known to offer superior temperature resistance properties relative to comparable metallic materials, however many challenges exist in adapting ceramic materials to gas turbine applications. Ceramic matrix composite (CMC) include woven ceramic fibre within a stiffening ceramic matrix filler, and are known for use in aerospace applications. While CMCs are able to withstand high temperature conditions with little if any cooling required, they are generally difficult to machine and can not easily be formed into the complex shapes often required for aerodynamic reasons in gas turbine engines, for example. Additionally, although strong at high temperatures, CMCs do not posses the thermal growth characteristics of metallic materials, and hence interfaces with adjacent metallic components are difficult to control without causing large thermal mismatch stresses, especially in conditions where temperature varies considerably. Therefore, there remains a need for an improved CMC combustor configuration.

SUMMARY

There is provided an annular reverse-flow combustor for a gas turbine engine, the combustor defining a combustion chamber therewithin, the combustor comprising: an inner liner having three liner portions substantially enclosing said combustion chamber, the three liner portions including a dome portion, a small exit duct portion and a large exit duct portion, each of the three liner portions being an independently formed hemi-toroidal shell composed of a ceramic matrix composite; radially inner and outer concentric metallic rings disposed between and interconnecting the dome portion with the small and large exit duct portions, wherein the outer metallic ring is disposed between an upstream end of the long exit duct portion and a radially outer end of the dome portion, and the inner metallic ring is disposed between an upstream end of the short exit duct portion and a radially inner end of the dome portion; and external metallic shells corresponding to and surrounding each of said three liner portions, and at least one spring element disposed between each of said metallic shells and a corresponding one of the three liner portions such as to produce a force against the three liner portions in a direction toward the inner and outer metallic rings, thereby generating a compressive pre-load in the liner portions composed of the ceramic matrix composite.

A gas turbine engine comprising an annular reverse-flow combustor with a combustor inner liner enclosing a combustion chamber and having a dome portion at an upstream end of the combustor and a downstream combustor exit defined between a small exit duct portion and a large exit duct portion, each of the dome portion, the small exit duct portion and the large exit duct portion being a separately formed hemi-toroidal shell composed of a ceramic matrix composite that is substantially free of airflow holes therethrough.

An annular reverse-flow combustor for a gas turbine engine, the combustor defining a combustion chamber therewithin, the combustor comprising an inner liner substantially enclosing said combustion chamber and having at least three liner portions including a dome, a small exit duct and a large exit duct, each of the three liner portions being an independently formed hemi-toroidal shell; and wherein at least one of the three liner portions is made of a ceramic matrix composite and a remainder of the three liner portions are metallic, the at least one of the three liner portions made of the ceramic matrix composite having a compressive pre-load force applied thereto.

Further details of these and other aspects will be apparent from the detailed description and figures included below.

BRIEF DESCRIPTION OF THE DRAWINGS

Reference is now made to the accompanying figures, in which:

FIG. 1 shows a schematic cross-section of a gas turbine engine;

FIG. 2 shows a partial cross-section of one embodiment of the present annular reverse flow combustor;

FIG. 3 shows an exploded view of ceramic matrix composite liner portions of the combustor of FIG. 2; and FIG. 4 shows a partial cross-section of another embodiment of the present annular reverse flow combustor.

DETAILED DESCRIPTION

FIG. 1 illustrates a gas turbine engine 10 of a type preferably provided for use in subsonic flight, generally comprising in serial flow communication a fan 12 through which ambient air is propelled, a multistage compressor 14 for pressurizing the air, an annular reverse flow combustor 16 in which the compressed air is mixed with fuel and ignited for generating an annular stream of hot combustion gases, and a turbine section 18 for extracting energy from the combustion gases.

The terms axial and radial as used herein are intended to be defined relative to the main longitudinally extending engine axis 11. Further, when referring to the combustor 16 herein, the terms upstream and downstream are intended to be defined relative to the generally flow of hot combustion gasses in the combustor, i.e. from a fuel nozzle end of the combustor where fuel and air is injected for ignition to a combustor exit where the combustion gases exit towards the downstream first turbine stage.

Referring to FIG. 2, the annular reverse flow combustor 16 comprises generally an inner combustor liner 17, directly exposed to and facing the combustion chamber 23 defined therewithin. The inner liner 17 of the combustor 16 is thus exposed to the highest temperatures, being directly exposed to the combustion chamber 23. As such, and as will be described in further detail below, the inner liner 17 is composed of at least one liner portion that is made of a ceramic matrix composite (CMC) material. Such a CMC liner portion is much better able to withstand high temperatures with little or no cooling in comparison with standard metallic combustor liners. An air plenum 20, which surrounds the combustor 16, receives compressed air from the compressor section 14 of the gas turbine engine 10 (see FIG. 1). This compressed air is fed into the combustion chamber 23, however as will be described further below, the CMC liner portions of the combustor 16 are substantially free of airflow passages (ex: cooling holes) extending therethrough. This greatly simplifies their production, as no additional machining steps (such as drilling of cooling holes) are required once the CMC liner portions are formed. As such, the compressed air from the plenum 20 is, in at least this embodiment, only fed into the combustion chamber 23 via air holes defined in metallic ring portions 32,34 of the combustor liner, as will be described further below. Metered air flow can also be fed into the combustion chamber via the fuel nozzles 30.

The inner liner 17 extends from an upstream end 21 of the combustor 16 (where a plurality of fuel nozzles 30, which communicate with the combustion chamber 23 to inject fuel therein, are located) to a downstream end (relative to gas flow in the combustion chamber) defining the combustor exit 27. The inner liner 17 is, in at least one embodiment, comprised of three main liner portions, namely a dome portion 24 at the upstream end 21 of the combustor, and a long exit duct portion 26 and a short exit duct portion 28 which together form the combustor exit 27 at their respective downstream ends. Each of the dome portion 24, long exit duct portion 26 and short exit duct portion 28, that are made of the CMC material and which make up a substantial part of the inner liner 17, have a substantially hemi-toroidal shape and constitute an independently formed shell, as best seen in FIG. 3.

The term "hemi-toroidal" shell as used herein is understood to mean a shell formed from roughly one half of a surface generated by a closed plane curve rotated about a line that lies in the same plane but does not intersect it. In the case of the three CMC liner portions of the combustor 16 as shown in FIG. 3, each of these CMC shells is a hemi-toroid formed having a substantially U-shaped configuration which is open in an axial direction, i.e. the toroid shape defined would be formed by rotating an oval or oblong about an axially extending axis and divided roughly in half by a radially extending plane that is perpendicular to the axially extending axis. As can be seen in FIG. 3, the long exit duct liner portion 26 and the short exit duct liner portion 28 have a radially outer end (i.e. those portions which abut the metallic rings 32, 34 shown in FIG. 2) of the U-shaped shell that projects rearwardly more than the radially inner ends thereof (the radially inner ends defining the combustor exit therebetween).

Referring back to FIG. 2, the dome portion 24 as described herein includes a substantially radially extending section 25 defining apertures 33 therein for receiving the fuel nozzles 30, as well as radially inner and outer liner wall sections 29 and 31 respectively, which extend downstream from the radially extending dome section 25, in a generally axial direction, towards the respective small and long exit duct portions 28 and 26 of the combustor liner. In the depicted embodiment, two annular rings 32 and 34, respectively disposed on the radially inner and outer sides of the combustor liner 17, are located in the liner walls between the upstream dome portion 24 and the downstream small and large exit ducts 28,26. The radially inner and outer rings 32 and 34 thereby provide an interface between the dome portion 24 and the other two liner portions, and each include a circumferential surface facing the combustion chamber. In the depicted embodiment, the metallic rings 32, 34 are substantially solid, i.e. have a much greater radial thickness than the comparatively very thin shell metal outer shell 36.

At least one of the three main liner portions, namely the dome portion 24, the small exit duct portion 28 and the large exit duct portion 26, is made of a ceramic material, and in one particular embodiment a CMC material. The ceramic material may be a monolithic ceramic (i.e. non-composite), or any ceramic based composite. The ceramic matrix composite (CMC) material referred to herein is understood to mean any ceramic based material having reinforcing fibres therein, whether these reinforcing fibres are made of ceramic, glass, or otherwise. As such, the CMC material may be a glass-composite or an oxide-composite, nonetheless having a ceramic matrix base material. In a particular embodiment, the CMC has flexible ceramic fibres (such as made of silicone carbine for example) which form a woven mesh and are embedded within a ceramic matrix base material.

In one embodiment, such as that shown in FIGS. 2 and 3 for example, all three of the main liner portions (i.e. dome portion 24, the small exit duct portion 28 and the large exit duct portion 26) are composed of CMC material, and the concentric rings 32, 34 which join the three liner portions 24, 26, 28 are metallic. As such, the metallic rings 32, 34 abut against the three CMC liner portions, forming a dissimilar material interface therebetween. In this embodiment, the CMC liner portions 24, 26 and 28 are not fastened to the metallic rings 32, 34, but rather are maintained in compressed sealing contact therewith by a system used to generate a compressive preload force on the CMC liner portions, and therefore between the abutted CMC liner portions and the central metallic rings 32, 34 disposed therebetween, as will be described.

A metallic outer shell 36 encloses the combustor liner 17 and is composed of three metallic shell sections 38, 40, 42 which respectively correspond to, and surround, each of the CMC liner portions 26, 28, 24. The metallic shell sections 38, 40, 42 are, in at least one embodiment, welded in place to the metallic rings 32 and 34 at weld points 44. The weld points 44 may in fact include annular welds about the circumference of the joint between the metallic shell sections and the metallic rings. In one possible embodiment, the metallic shell sections are formed of a thin, lightweight sheet metal material.

The metallic outer shell sections are radially spaced apart from the CMC liner portions, forming a substantially radial air gap 46 therebetween. The air gap 46 allows back side cooling of the outer surfaces of the CMC liner portions 26, 28, 24 by allowing cooling airflow from outside the combustor 16 to enter into the radial gap 46 where it will flow around the CMC liner portions cooling them, the cooling air eventually being ejected back into the main flow of combustion gases, either directly into the combustion chamber via holes formed in the metallic ring portions 32,34, or through openings 49 between the CMC liners and the corresponding outer metallic shell sections at the exit 27 of the combustor. The air may be fed or pulled into the annular air gap 46 by any suitable means, such as by the pressure drop existing across the combustor, via holes in the outer metallic shell sections or inlet holes formed in the metallic rings 32, 34, for example. The CMC liner portions are therefore not required to have any special cooling features therein, such as machined cooling holes for example, which avoids the need to separately form cooling holes in the difficult to machine CMC material. As no cooling air appears on the hot side of the CMC shells, the emissions and gas temperate patterns of the combustor are also thus improved.

The CMC liner 17 is supported within the surrounding outer metallic shell 36 by a number of spring elements 50. At least one of the spring elements 50 is disposed between each of the outer metallic shells and the corresponding inner CMC liner portion, i.e. within the radial gap 46, the spring elements 50 acting inwardly against the CMC liner portions. The spring elements 50 are substantially flexible and, in at least one embodiment, are annular metal springs having a substantially U-shaped cross-sectional shape. The metallic annular springs 50 need not be fully circumferential, and may be split rings. Regardless of their specific form, the spring elements 50 apply substantially axial-directed loads against the CMC liner portions such as to generate a compressive pre-load in the CMC liner portions. In the embodiment of FIG. 2, the spring elements 50 apply axial loads against the CMC liner portions such as to force them against the central metallic rings 32,34, thereby locking compressive pre-loads into the CMC liner portions. The spring force of the spring elements 50 is chosen such as to apply a pre-load force sufficient to prevent unloading of the force between the shells, during heating and cooling transient cycles which are often imposed on the combustor by the gas turbine engine during operation thereof. Fastening (such as by welding) the outer metallic shells to the solid metallic rings 32, 34 traps the CMC liner portions under this compressive pre-load.

As noted above, the CMC liner portions 24, 26 and 28 are not fastened to the metallic rings 32, 34, but rather are abutted there against and maintained in sealed contact therewith by the spring elements 50 which generate the aforementioned compressive pre-load in the CMC liner portions, the compressive force in combination with the friction between the CMC liner portions and the metallic rings maintaining the CMC liner portions and the central metallic rings 32, 34 disposed in contact. This accordingly forms a relative "floating" style joint between the CMC liner portions and the metallic rings, such as to absorb any thermal growth differential therebetween while nonetheless ensuring a sealed engagement between the two different materials. If desired, addition seals (for example "rope" seals) may also be provided on either the metallic rings or the abutting edges of the CMC liner portions, to improve the seal therebetween. Such seals nonetheless allow for the floating of the two different materials relative to each other such as to de-couple the metal from the ceramic and thus permit the accommodation of thermal growth differential between the dissimilar materials.

Although a number of possible configurations for mounting the combustor 16 described above within the engine 10 are possible, these may include an axial and circumferential support respectively engaged to the dome metallic shell 42 and the long exit duct metallic shell 38, for example, and wherein each of these supports can allow for thermal growth in at least one of a radial and axial direction. A sliding-type sealing joint may be formed at the exit 27 of the combustor 16, whereby support flanges engage the combustor at its exit, such as to allow for thermal growth differential while maintaining a seal to limit losses of combustor gases.

Referring now to the embodiment of FIG. 4, a combustor 116 in accordance with an alternate embodiment is depicted, the combustor 116 having an inner liner 117 which is only partially composed of a CMC material. Particularly, the depicted inner liner 117 of the combustor 116 is made up of a CMC dome portion 124 (including the inner and outer liner wall sections 129 and 131 which are integral and are also made of the CMC material), which forms a hemi-toroidal shell, while the short and long exit duct portions 128 and 126 are both made of a metallic material (ex: sheet metal). Thus, the combustor 116 is a hybrid combustor, in that the CMC material is only used for a part of the combustor inner liner 117. It is to be understood that although the combustor liner 117 has a CMC dome portion 124 and metallic short and long exit duct portions 128,126, that the hybrid combustor 116 may alternately include a metallic dome portion and wherein at least one of the short and long exit ducts is made of the CMC material. The remaining features of the hybrid combustor 116 otherwise remain similar to the fully CMC combustor liner 17 described above. Namely, the CMC liner portion 124 is forced against the metallic rings 132 and 134 by spring elements 150 which generate the axially-directed (i.e. towards the rings 132,134) force on the CMC dome liner portion 124 in order to generate the compressive pre-load therein. An outer metallic dome shell 142 also surrounds the CMC dome liner portion 124 and is spaced apart therefrom to form an annular air gap 146, and the ends of the metallic shell section 142 are fastened, such as by welding, to the metallic rings 132 and 134, thereby locking the compressive pre-load into the CMC liner portion 124.

The above description is meant to be exemplary only, and one skilled in the art will recognize that changes may be made to the embodiments described without department from the scope of the invention disclosed. Modifications which fall within the scope of the present invention will be apparent to those skilled in the art, in light of a review of this disclosure, and such modifications are intended to fall within the appended claims.

The invention claimed is:

1. An annular reverse-flow combustor of a gas turbine engine, the combustor defining a combustion chamber therewithin, the combustor comprising:
    an inner liner having liner portions substantially enclosing said combustion chamber, the liner portions including a dome liner portion, a small exit duct liner portion and a large exit duct liner portion, the dome liner portion and the large exit duct liner portion being hemi-toroidal shells composed of a ceramic matrix composite;
    radially inner and outer concentric metallic rings disposed between and interconnecting the dome portion with the small and large exit duct portions, wherein the outer metallic ring is disposed between an upstream end of the long exit duct portion and a radially outer end of the dome portion, and the inner metallic ring is disposed between an upstream end of the small exit duct portion and a radially inner end of the dome portion;
    external metallic shells corresponding to and surrounding each of said three liner portions, the external metallic shells being spaced apart from the liner portions to define an annular gap therebetween which is free of other material, the external metallic shell surrounding the small exit duct portion being fastened to the inner metallic ring and retaining the small exit duct portion in place; and
    one or more spring element disposed between said dome liner portion and said large exit duct liner portion and a corresponding one of said metallic shells, said spring element producing a force against the corresponding liner portion in a direction toward the inner and outer metallic rings thereby generating a substantially axially directed compressive pre-load force in the corresponding liner portions composed of the ceramic matrix composite.

2. The annular reverse-flow combustor as defined in claim 1, wherein the liner portions made of the ceramic matrix composite are substantially free of airflow holes therethrough.

3. The annular reverse-flow combustor as defined in claim 1, wherein a plurality of airflow holes extend through the inner and outer metallic rings, said plurality of airflow holes providing combustion air flow into the combustion chamber.

4. The annular reverse-flow combustor as defined in claim 1, wherein the spring elements include annular metallic compression springs.

5. The annular reverse-flow combustor as defined in claim 1, wherein the external metallic shells are permanently fastened to the inner and outer metallic rings, said spring elements maintaining said the dome liner portion and the large exit duct liner portion in contact with the inner and outer metallic rings without being fastened thereto.

6. A combustor liner assembly for an annular reverse-flow combustor of a gas turbine engine, the combustor defining a combustion chamber therein, the combustor liner assembly comprising:
   an upstream end defining a dome portion of the combustor liner assembly and a downstream end defining an exit duct portion of the combustor liner assembly;
   a pair of separately formed radially inner and outer concentric metallic rings disposed between and interconnecting the dome portion and the exit duct portion, the outer metallic ring being disposed between an upstream end of a long exit duct wall of the exit duct portion and a radially outer downstream end of the dome portion, and the inner metallic ring being disposed between an upstream end of a small exit duct wall of the exit duct portion and a radially inner downstream end of the dome portion;
   wherein the dome portion and the long exit duct wall of the exit duct portion of the combustor liner assembly each having an inner ceramic liner and an outer metallic shell surrounding the inner ceramic liner and radially spaced apart therefrom to define an annular air gap therebetween, the inner ceramic liner being composed of a ceramic matrix composite and formed as a hemi-toroidal shell;
   the small exit duct wall of the exit duct portion including at least an outer metallic shell fastened to the inner metallic ring and retaining the small exit duct wall of the exit duct portion in place; and
   at least one spring element disposed between the inner ceramic liner and the outer metallic shell of the dome portion and the long exit duct wall of the exit duct portion, the spring element producing a substantially axially directed compressive pre-load force against the inner ceramic liner in a direction toward said metallic rings to generate a compressive pre-load in the inner ceramic liners.

7. The combustor liner assembly as defined in claim 6, wherein the inner ceramic liners are substantially free of airflow holes therethrough.

8. The combustor liner assembly as defined in claim 6, wherein the spring elements include annular metallic compression springs.

9. The combustor liner assembly as defined in claim 6, wherein the outer metallic shells are permanently fastened to the metallic rings, the spring elements maintaining the inner ceramic liners in contact with the metallic rings without being fastened thereto.

* * * * *